United States Patent
Bellamkonda et al.

(10) Patent No.: US 11,638,171 B2
(45) Date of Patent: Apr. 25, 2023

(54) SYSTEMS AND METHODS FOR DYNAMIC WIRELESS NETWORK CONFIGURATION BASED ON MOBILE RADIO UNIT LOCATION

(71) Applicant: Verizon Patent and Licensing Inc., Basking Ridge, NJ (US)

(72) Inventors: Krishna K. Bellamkonda, Flower Mound, TX (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/349,537

(22) Filed: Jun. 16, 2021

(65) Prior Publication Data
US 2022/0408300 A1 Dec. 22, 2022

(51) Int. Cl.
*H04W 28/02* (2009.01)
*H04W 72/08* (2009.01)
*H04W 72/04* (2023.01)
*H04W 88/10* (2009.01)

(52) U.S. Cl.
CPC ..... *H04W 28/0226* (2013.01); *H04W 72/048* (2013.01); *H04W 72/087* (2013.01); *H04W 88/10* (2013.01)

(58) Field of Classification Search
CPC .................................. H04B 7/185; H04B 7/18
See application file for complete search history.

(56) References Cited

U.S. PATENT DOCUMENTS

| | | | |
|---|---|---|---|
| 2005/0260973 A1* | 11/2005 | van de Groenendaal | H04W 12/08 455/411 |
| 2006/0234757 A1* | 10/2006 | Choi | H04W 36/32 455/525 |
| 2017/0245200 A1* | 8/2017 | Langley | H04W 4/027 |

* cited by examiner

*Primary Examiner* — Sulaiman Nooristany

(57) ABSTRACT

A system described herein may provide for the use of modeling techniques to generate models associated with various locations or regions (e.g., sectors) associated with one or more radio access networks ("RANs") of a wireless network, as well as for one or more mobile radio units ("MRUs") that include wireless network infrastructure and which may be dynamically moved from one location to another. The system may identify attributes of a location within the network at which the MRU is located, and may automatically configure base stations of the RAN as well as the wireless network infrastructure of the MRU in order to optimize the operation of the RAN, as well as to gain optimal usage of the MRU.

20 Claims, 10 Drawing Sheets

SYSTEMS AND METHODS FOR DYNAMIC WIRELESS NETWORK CONFIGURATION BASED ON MOBILE RADIO UNIT LOCATION

BACKGROUND

Wireless networks, such as Long-Term Evolution ("LTE") networks, Fifth Generation ("5G") networks, or the like, may include radio access networks ("RANs"), via which user equipment ("UE"), such as mobile telephones or other wireless communication devices, may receive wireless service. Some RANs may be implemented or augmented by vehicle-mounted or other types of mobile RAN infrastructure devices, which may provide wireless coverage in varying locations.

DETAILED DESCRIPTION OF EXAMPLE EMBODIMENTS

Figure 1A:
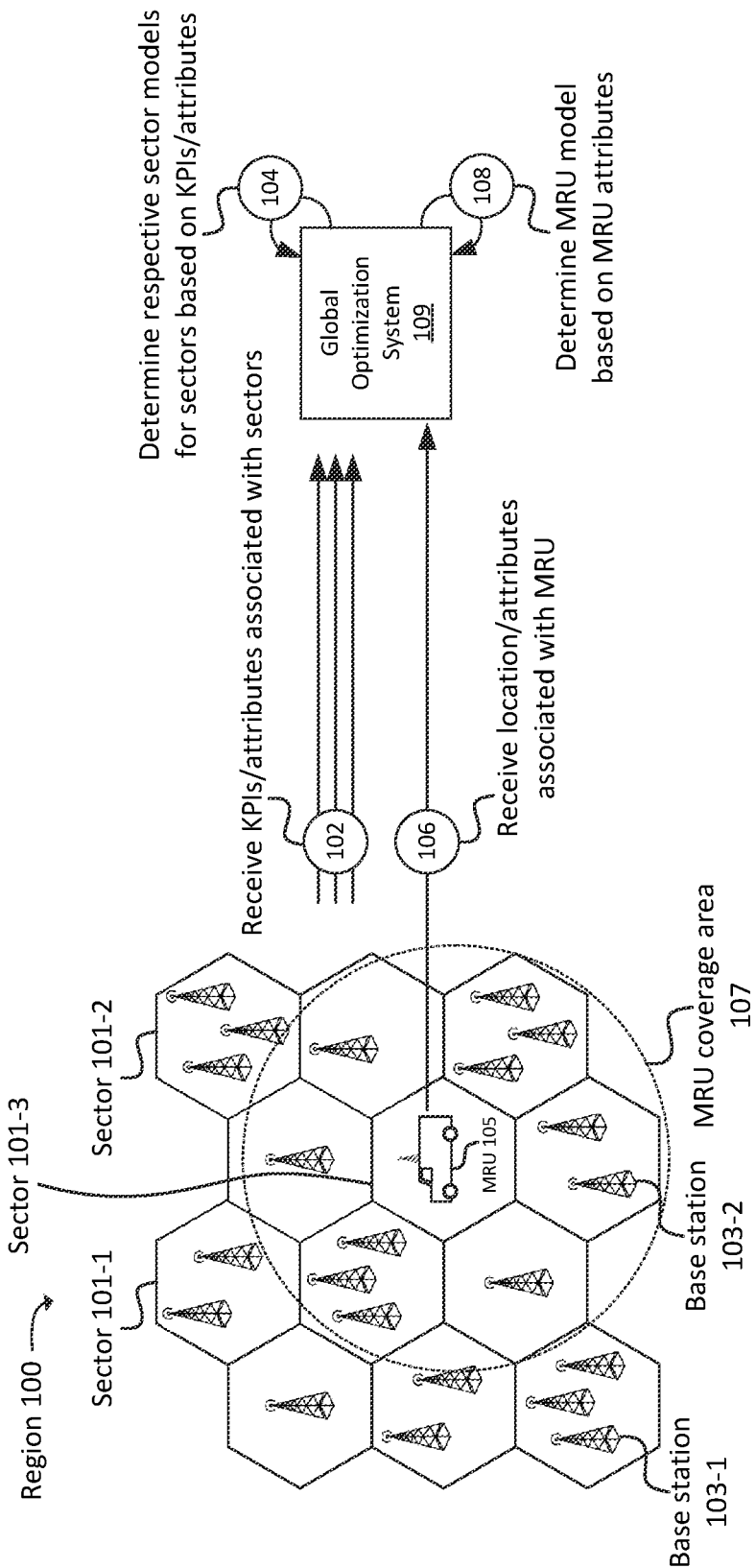
FIGS. 1A and 1B illustrate an example overview of one or more embodiments described herein.

The following detailed description refers to the accompanying drawings. The same reference numbers in different drawings may identify the same or similar elements.

Embodiments described herein provide for the use of artificial intelligence/machine learning ("AI/ML") techniques or other suitable techniques to model attributes, characteristics, key performance indicators ("KPIs"), and/or other information associated with various locations or regions associated with one or more RANs of a wireless network (e.g., a Long-Term Evolution ("LTE") network, a Fifth Generation ("5G") network, and/or another type of network). As discussed herein, such locations or regions may be referred to as "sectors." Further, in the examples discussed herein, sectors may include evenly distributed areas of a uniform shape (e.g., a hexagon). In practice, sectors may be arranged or defined differently. For example, in some embodiments, sectors may be defined with respect to the location of one or more base stations of a RAN (e.g., where a sector may be defined based on a coverage area of the one or more base stations and/or may be defined based on a physical location at which one or more antennas or other physical equipment of the base stations are installed), and/or may be defined independently of the location of the one or more base stations.

Embodiments described herein further provide for the use of AI/ML techniques or other suitable techniques to determine configuration parameters of a RAN (e.g., configuration parameters of one or more base stations of the RAN) based on the presence or availability of a mobile radio unit ("MRU") at a particular geographical location associated with the RAN (e.g., within, adjacent to, and/or proximate to one or more sectors of the RAN). Embodiments described herein further provide for the use of AI/ML techniques or other suitable techniques to determine configuration parameters of the MRU based on attributes, configuration parameters, KPIs, etc. of sectors of the RAN in which the MRU is located, to which the MRU is adjacent, and/or to which the MRU is proximate (e.g., within a threshold proximity).

An MRU of some embodiments may include, for example, a vehicle-mounted (or otherwise mobile) base station, radio unit ("RU"), and/or other wireless infrastructure. In some embodiments, the MRU may include and/or may be communicatively coupled to a Multi-Access/Mobile Edge Computing ("MEC") device, referred to sometimes herein simply as a "MEC," which may be co-located with the MRU (e.g., affixed to a same vehicle or other apparatus that facilitates mobility of the MRU).

Configuration parameters of the RAN and/or the MRU that may be adjusted in accordance with embodiments described herein may include parameters such as beamforming parameters (e.g., azimuth angle, beam width, and/or beam power associated with one or more beams associated with the RAN or the MRU), carrier aggregation parameters (e.g., whether to use carrier aggregation, bands and/or frequencies on which carrier aggregation should be used, etc.), routing parameters (e.g., traffic may be routed to a MEC associated with the MRU in lieu of to a MEC associated with a particular base station and/or to a core of the wireless network, backhaul traffic may be routed via the MRU in lieu of some other backhaul link, etc.), mobility parameters (e.g., the MRU may be included in a neighbor cell list ("NCL") used by one or more base stations of the RAN, the MRU may be indicated as a "preferred" cell for handovers to or from one or more base stations of the RAN, etc.), and/or other suitable parameters as described herein.

The configuration of the MRU based on attributes of the RAN, as described herein, may generally be geared towards improving aspects of the RAN (e.g., sectors of the RAN that are within a coverage area associated with the MRU and/or sectors of the RAN that are proximate to the coverage area associated with the MRU). For example, embodiments described herein may determine, based on RAN KPIs, configuration parameters, etc. that performance metrics associated with the RAN are below a threshold level, such as a maximum latency being exceeded or a minimum throughput not being met. In such a scenario, the MRU may be configured to improve latency or throughput, such as by serving as a relay node between base stations, serving as a priority or primary cell (e.g., where User Equipment ("UEs") are instructed to connect to the MRU in lieu of other base stations that are in range of the UEs), performing carrier aggregation, or the like. As another example, embodiments described herein may determine that a MEC associated with a particular base station is overloaded (e.g., utilization of processing resources or other resources of the MEC may exceed a threshold level of utilization), and may configure a MEC associated with the MRU to offload or handle some or all traffic in lieu of the MEC of the particular base station. Other examples of the configuration of the MRU based on attributes of the RAN are provided below.

Similarly, configuration parameters of the RAN may be adjusted based on the presence of the MRU at a given geographical location associated with the RAN. For example, beamforming parameters associated with base stations of the RAN may be modified to point away from a coverage area associated with the MRU when the MRU is located within a given sector of the RAN. As another example, routing parameters of the RAN may be modified, such as MEC traffic routing parameters, backhaul traffic routing parameters, etc. As yet another example, bands or frequencies used by base stations of the RAN may be selected or modified based on bands or frequencies used by the MRU (e.g., to avoid collisions, interference, etc.). Other examples of the configuration of the RAN based on attributes and/or location of the MRU are provided below.

Since embodiments described herein include the determination and performance of actions in a dynamic manner that is based on the particular attributes, performance metrics, etc. of sectors in which an MRU is located, the overall performance of the RAN may be enhanced. Further, as described herein, the association between particular sector models, interference models, and/or associated configuration parameters may be generated and/or refined using one or more AI/ML techniques or other suitable techniques (e.g., deep learning, reinforced or unreinforced machine learning, neural networks, K-means clustering, regression analysis, and/or other suitable techniques). In this manner, the particular configuration parameters, performance metrics, etc. of a sector may be taken into account when selecting configuration parameters of the MRU and/or modified configuration parameters of the RAN. Further, some or all of the operations may be performed automatically, thus eliminating the need for manual configuration of the RAN and/or MRU. As such, the MRU may be positioned at any location within the coverage area(s) of a RAN and may improve the operation of the RAN in a manner that is optimally suited to the particular conditions or demands of the RAN at or near such location.

As shown in FIG. 1A, for example, geographical area (or region) 100 may be subdivided into a set of sectors 101. The set of sectors 101 may include, as shown, sector 101-1, 101-2, and one or more additional sectors that are not explicitly illustrated with a reference numeral. Further in this example, each sector 101 may be associated with discrete network infrastructure elements, such as particular base stations 103. For example, base station 103-1 may be located in one particular sector 101, while base station 103-2 may be located in another sector 101. Further, additional base stations 103 (e.g., base stations not explicitly illustrated with a reference numeral) may be present in geographical region 100. That is, the location of each base station 103 may be within a particular geographical area (e.g., a hexagonal-shaped geographical area, in this example) that corresponds to a respective sector 101. Some sectors 101 may include at least one base station 103, while other sectors 101 may not include any base stations 103.

In the example discussed herein, MRU 105 may be located within sector 101-3. As discussed above, MRU 105 may include one or more network infrastructure elements, such as one or more RUs, base stations 103 (and/or one or more components of a base station 103), MECs, or other network infrastructure elements. MRU 105 may include, and/or may be affixed, mounted, etc. to, one or more vehicles, such as a truck, a drone, or the like. Additionally, or alternatively, MRU 105 may be or may include network infrastructure elements that are movable and deployable without any additional mobility apparatus, vehicles, or the like.

MRU 105 may be associated with coverage area 107, which may be an area in which radio frequency ("RF") signals emitted by network infrastructure elements (e.g., a base station, a RU, an antenna, etc.) of MRU 105 may reach, and/or may be measured with at least a threshold amount of received radio power. MRU coverage area 107 is shown as a circle in this example; in practice, MRU coverage area 107 may be another shape or set of shapes, and/or may be defined in some other suitable manner. In some embodiments, MRU coverage area 107 may be defined based on a radius or diameter of a circle, with MRU 105 as a center point of the circle.

As shown, Global Optimization System ("GOS") 109 may receive (at 102) KPIs and/or attributes associated with one or more sectors 101. The KPIs may include RF metrics, such as measures of signal quality, signal strength, interference, or the like, at given sectors 101 and/or locations within sectors 101. Such measures may include and/or may be based on, for example, Received Signal Strength Indicator ("RSSI") values, Reference Signal Receive Power ("RSRP") values, Signal-to-Interference-and-Noise-Ratio ("SINR") values, Channel Quality Indicator ("CQI") values, or the like.

In some embodiments, such measures may be included in, and/or derived from, measurement reports received from UEs located within sectors 101. For example, a particular measurement report from a given UE may indicate that the UE detected RF signals, according to a particular set of frequencies, from a first base station 103-1, and further that the UE detected RF signals, according to the same set of frequencies, from a second base station 103-2. In this scenario, the detection of RF signals according to the same set of frequencies from two different base station (i.e., base station 103-1 and 103-2) may indicate RF interference at a geographical location of the UE, arising from signals output by base stations 103-1 and 103-2.

As another example, the measurement report from a given UE may indicate a relatively low RSSI value, RSRP value, etc. associated with signals from a given base station 103. Such values may be "relatively" low in that such values may be below a threshold value, and/or may be lower than an expected value (e.g., which may be determined based on a historical analysis of RF metrics). Further, such analysis may be performed based on location, where a first threshold value may be used at a first location (e.g., relatively close to base station 103), while a second threshold value may be used at a second location (e.g., farther away from base station 103).

In some embodiments, GOS 109 may further receive and/or maintain attribute and/or characteristic information for one or more sectors 101. Briefly, such attribute and/or characteristic information may include configuration parameters (e.g., beamforming configuration parameters, RF transmission power parameters, Multiple-Input Multiple-Output ("MIMO") configuration parameters, or the like), physical network infrastructure parameters (e.g., antenna height, antenna location, etc.), locale features (e.g., building density, topographical information, or the like), and/or other types of information associated with respective sectors 101 and/or network infrastructure associated with respective sectors 101 (e.g., network infrastructure located within given sectors 101, and/or providing wireless service to given sectors 101).

In some embodiments, GOS 109 may communicate with base stations 103 of sectors 101 and/or UEs located within such sectors 101 via an application programming interface ("API"), an X2 interface, and/or some other suitable communication pathway, in order to receive such information. For example, base stations 103 and/or UEs communicatively coupled to respective base stations 103 may "push" such information to GOS 109 (e.g., via the API) on a periodic or intermittent basis, upon the occurrence of trigger events (e.g., the detection of a reference signal from one or more base stations 103 by a UE located within a given sector 101, one or more Quality of Service ("QoS") metrics exceeding a threshold value, a connection or disconnection of one or more UEs to one or more base stations 103, and/or other events), and/or on some other basis. In some embodiments, GOS 109 may "pull" (e.g., request or otherwise obtain) such information from the UEs, base stations 103, and/or other device or system that receives, collects, maintains, and/or provides such information. For example, GOS 109 may be communicatively coupled to a Service Capability Exposure Function ("SCEF") of a core network associated with base stations 103, a Network Exposure Function ("NEF"), and/or other suitable device, system, function, etc.

As further shown, GOS 109 may determine (at 104) one or more sector models associated with respective sectors 101 based on the received (at 102) KPIs, attributes, etc. For example, as discussed below, GOS 109 may use AI/ML techniques or other suitable techniques to identify one or more sector models that include attributes, KPIs, etc. that are similar to the attributes, KPIs, etc. associated with respective sectors 101. For example, when determining whether attributes of a given sector model are "similar" to attributes of a given sector 101, GOS 109 may generate one or more scores, classifiers, or the like, and/or may perform a suitable similarity analysis to determine a measure of similarity between attributes of a set of sector models and attributes of a given sector 101. In some embodiments, GOS 109 may select a particular sector model if the measure of similarity exceeds a threshold measure of similarity. Additionally, or alternatively, GOS 109 may select a particular quantity of highest-scoring sector models (e.g., the highest scoring sector model, the top three scoring sector models, etc.). In some embodiments, GOS 109 may select a particular quantity of highest-scoring sector models, so long as the scores associated with such sector models exceed a threshold score (e.g., the top three scoring sector models so long as the top three scoring sector models exceed the threshold score, the top two scoring sector models if the third highest-scoring sector model is below the threshold score, etc.).

GOS 109 may further receive (at 106) location information and/or attributes associated with MRU 105. For example, GOS 109 may receive location information associated with MRU 105 after MRU 105 is deployed within a given sector (e.g., sector 101-3). For example, MRU 105 may output location information to GOS 109 after MRU 105 has been stationary for at least a threshold amount of time (e.g., indicating that MRU 105 has completed traveling from an origin to a destination within sector 101-3). As another example, MRU 105 may output location information to GOS 109 after a vehicle or other type of mobility apparatus associated with MRU 105, and/or to which MRU 105 is affixed, has been powered off. In some embodiments, GOS 109 may receive an estimated and/or predicted location of MRU 105 (e.g., within sector 101-3) prior to GOS 109 being located within sector 101-3. As yet another example, GOS 109 may evaluate different locations within region 100 (e.g., within different sectors 101, and/or at particular locations within sectors 101) in order to determine optimal configuration parameters for different locations. In such scenarios, after MRU 105 has been deployed to a particular location, optimal configuration parameters may be provided to MRU 105 and/or to suitable sectors 101 in a manner described below.

GOS 109 may additionally receive (at 106) attributes associated with MRU 105. For example, GOS 109 may receive configuration parameters (e.g., beamforming configuration parameters, RF transmission power parameters, MIMO configuration parameters, bands and/or frequencies implemented by MRU 105, or the like), physical network infrastructure parameters (e.g., antenna height, antenna location, etc.), and/or other types of information associated with a configuration of MRU 105 and/or network infrastructure associated with MRU 105. Additionally, or alternatively, GOS 109 may receive performance metrics associated with MRU 105, such as an amount of measured latency, throughput, jitter, etc. of traffic between MRU 105 and one or more UEs. Additionally, or alternatively, GOS 109 may receive performance and/or other information regarding one or more MECs implemented by MRU 105, such as a measure of processing resources and/or capacity, a measure of memory resources and/or capacity, a measure of storage resources, or the like. In some embodiments, GOS 109 may receive information indicating which parameters of MRU 105 are static and which parameters are configurable. For example, MRU 105 may be associated with some parameters which may not be changed and/or which are not authorized to be changed, while other parameters may be able to be changed and/or are authorized to be changed. GOS 109 may receive (at 106) information regarding MRU 105 from MRU 105 (e.g., via an API or other suitable communication pathway) and/or from some other device or system that maintains and/or provides such information regarding MRU 105.

GOS 109 may further determine (at 108) an MRU model based on the attributes of MRU 105. For example, as discussed below, GOS 109 may use AI/ML techniques or other suitable techniques to identify one or more MRU models that include attributes, KPIs, etc. that are similar to the attributes, KPIs, etc. associated with MRU 105. For example, when determining whether attributes of a given MRU model are "similar" to attributes of MRU 105, GOS 109 may generate one or more scores, classifiers, or the like, and/or may perform a suitable similarity analysis to determine a measure of similarity between attributes of a set of MRU models and attributes of MRU 105. In some embodiments, GOS 109 may select a particular MRU model if the measure of similarity exceeds a threshold measure of similarity. Additionally, or alternatively, GOS 109 may select a particular quantity of highest-scoring MRU models (e.g., the highest scoring MRU model, the top three scoring MRU models, etc.). In some embodiments, GOS 109 may select a particular quantity of highest-scoring MRU models, so long as the scores associated with such MRU models exceed a threshold score (e.g., the top three scoring MRU models so long as the top three scoring MRU models exceed the threshold score, the top two scoring MRU models if the third highest-scoring MRU model is below the threshold score, etc.).

Figure 1B:
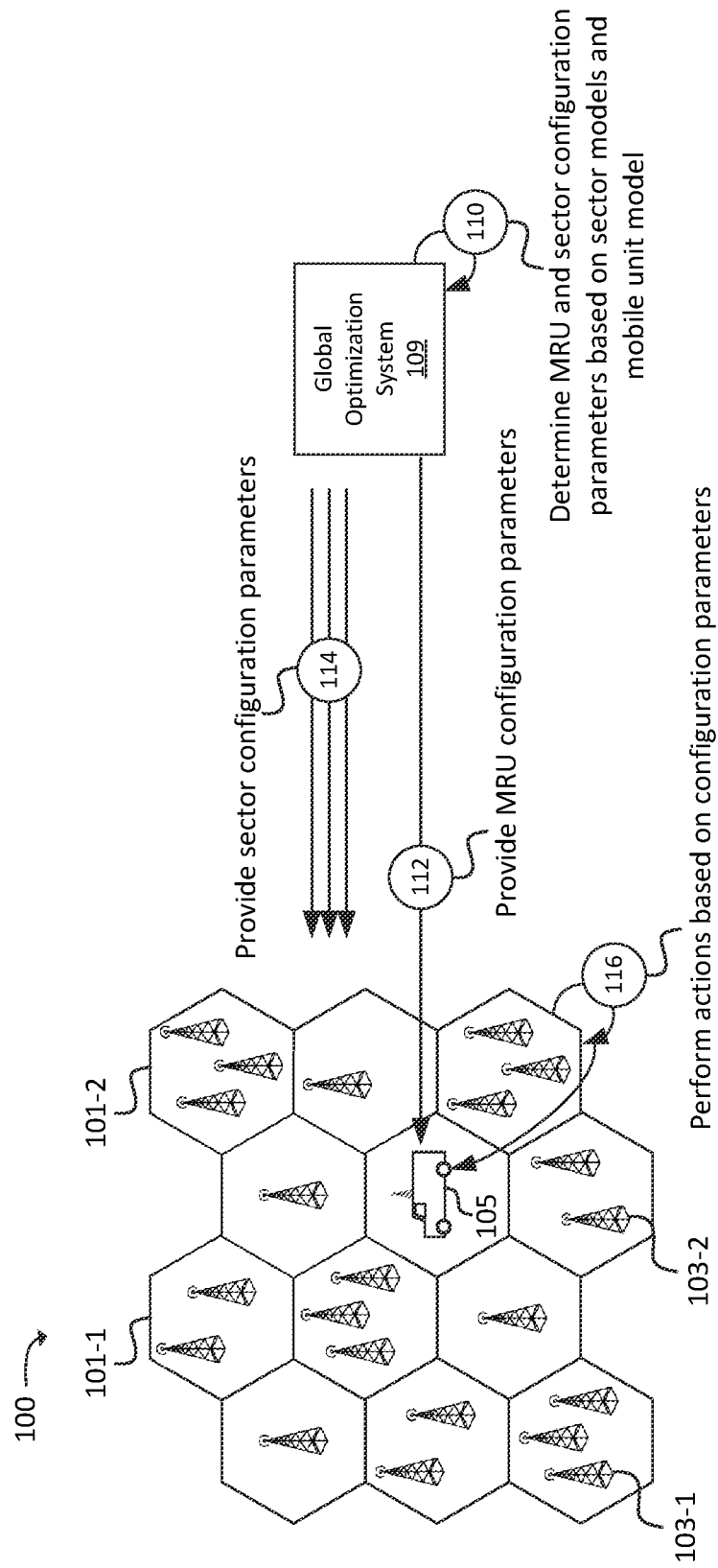

As shown in FIG. 1B, GOS 109 may further determine (at 110) one or more configuration parameters, remedial actions, and/or performance-enhancing actions to implement with respect to one or more sectors 101 and/or MRU 105. GOS 109 may further provide (at 112 and 114, respectively) the configuration parameters to MRU 105 and one or more sectors 101 (e.g., base stations 103 of one or more sectors 101). MRU 105 and sectors 101 may perform actions and/or modify configuration parameters based on the received (at 112 and 114) configuration parameters.

For example, GOS 109 may determine actions such as modifying Physical Resource Blocks ("PRBs") used by MRU 105 and/or one or more base stations 103, in order to avoid collisions or interference between wireless signals associated with MRU 105 and the one or more base stations 103. In some embodiments, the actions may include one or more other types of actions, such as modifying a beamforming configuration of MRU 105 and/or one or more base stations 103 (e.g., beam width, power, azimuth angle, and/or tilt angle), implementing or modifying a cell suspend mode at one or more base stations 103, implementing or modifying a coordinated multi-point configuration of MRU 105 and/or multiple base stations 103 (e.g., base stations 103 that interfere with each other or with MRU 105), and/or other suitable actions.

In some embodiments, the configuration parameters, actions, etc. may include mobility parameters, such as modifying an NCL associated with one or more base stations 103 to include MRU 105. Additionally, or alternatively, the configuration parameters may include modifying a priority or ranking of an NCL or other suitable information, to identify MRU 105 as a "preferred" cell for handovers. For example, such modification may cause base stations 103 to facilitate handovers of UEs to MRU 105 in appropriate situations, such as when UEs are within a coverage area of MRU 105 and/or when signal quality metrics associated with MRU 105 and the UEs exceed a threshold level.

As additionally noted above, the configuration parameters, actions, etc. may include modifying traffic routing parameters, such as causing one or more base stations 103 to route traffic to MRU 105. Such traffic may include, for example, traffic that is to be processed by a MEC. For example, a MEC associated with a given base station 103 may be overloaded (e.g., processing resource utilization associated with the MEC may be above a threshold measure of utilization), and routing such traffic to a MEC associated with MRU 105 may reduce the load on the MEC associated with base station 103, thus resulting in improved overall performance of MEC traffic.

As another example, modifying traffic routing parameters may include causing MRU 105 to be used as a communication relay associated with one or more base stations 103. For example, MRU 105 may be configured as a "network extender" or communication relay for a given base station 103. Such a scenario may occur when one or more sectors 101 in which MRU 105 is located (or is expected to be located) has gaps in wireless coverage provided by base stations 103, where such "gaps" may refer to areas in which no wireless coverage is provided, and/or in which wireless coverage is provided with signal strength or quality (or other suitable metrics) below one or more threshold values. MRU 105 may thus connect to a given base station 103 (e.g., within the same sector 101 as MRU 105 and/or within a sector 101 that is proximate to the sector 101 in which MRU 105 is located) in an "extender" or "repeater" configuration, in which MRU 105 provides wireless coverage to UEs within a coverage area of MRU 105 and relays traffic between the UEs and base station 103.

As yet another example, modifying traffic routing parameters may include causing MRU 105 to be used as a wireless backhaul link between one or more base stations 103 and a core network. For example, MRU 105 may be configured as an Integrated Access Backhaul ("TAB") node or some other type of suitable configuration, in which MRU 105 serves as a communication relay between one or more base stations 103 and the core network. For example, MRU 105 may receive traffic from the core network for one or more UEs, and may provide the traffic over a wireless interface to a particular base station 103 to which the UE is connected. Similarly, MRU 105 may wirelessly receive traffic from one or more UEs via one or more base stations 103, and may forward the traffic to the core network.

In some embodiments, some of the configuration parameters may be modified on a per-slice or other granular or segmented basis. For example, the wireless network may be associated with different "slices," Data Network Names ("DNNs"), QoS flows, or other delineations, where a slice (or other delineation) refers to a differentiated set of traffic treatment, QoS levels, Service Level Agreements ("SLAs"), or the like. For example, assume that a given base station 103 associated with a particular sector 101 carries traffic associated with two different slices having two different QoS levels. In the event that latency associated with a first slice (but not a second slice) is above a threshold level, GOS 109 may determine (at 110) configuration parameters in order to improve the latency of traffic associated with the first slice. Such configuration parameters may omit any modifications to treatment or handling of the second slice.

For example, GOS 109 may determine (at 110) that MRU 105 should act as a relay node between UEs and base station 103 for traffic associated with the first slice, but may not determine that MRU 105 should act as a relay node between UEs and base station for traffic associated with the second slice. In some embodiments, additional or alternative classifications, categories, attributes, or the like may be used to differentially treat traffic and/or to configure MRU 105 and/or sectors 101. For example, GOS 109 may configure sectors 101 to route traffic associated with particular applications and/or particular sets of UEs (e.g., UEs associated with a particular organization, group, enterprise, device type, etc.) to a MEC associated with MRU 105, while traffic associated with different applications and/or particular sets of UEs may be handled by MECs associated with base stations 103 located within sectors 101 (and/or may be provided to a core network).

The configuration (at 110 and/or 112) of MRU 105 and/or sectors 101 may allow for "touchless" configuration of MRU 105 and/or sectors 101 based on the presence of MRU 105 within a particular sector 101. For example, an administrator or other entity may not need to manually configure parameters of MRU 105 and/or sectors 101 in order to achieve an optimal configuration of MRU 105 and/or sectors 101, or even to determine what configuration parameters would result in optimal performance. For example, embodiments described herein may automatically determine potential shortcomings at a particular location within a given sector 101 (e.g., high latency at the location, low throughput at the location, slow MEC processing at the location, high RF interference at the location, etc.), and may configure MRU 105 to remediate such shortcomings (e.g., where such remediation may further be based on attributes or capabilities of MRU 105). Further, sectors 101 may be configured in conjunction with MRU 105, such that the configuration of MRU 105 and sectors 101, as a whole, complement each other and both serve to achieve an overall improvement in network performance.

Figure 2:
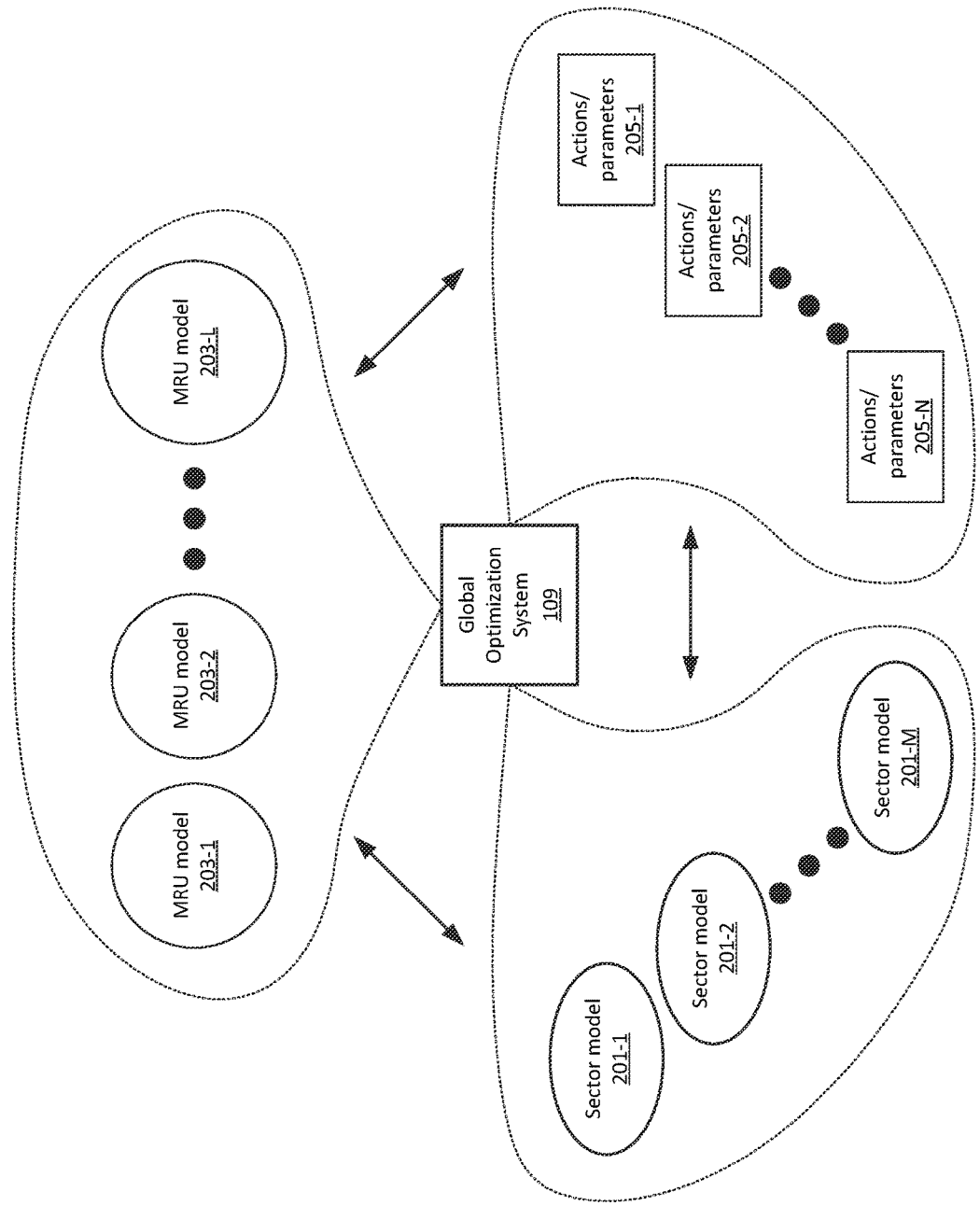
FIG. 2 illustrates example interference models, sector models, and/or configuration parameters that may be generated, received, maintained, provided, etc. by a mobile radio unit ("MRU") of some embodiments.

FIG. 2 illustrates example MRU models, sector models, and/or actions/parameters that may be generated, received, maintained, provided, etc. by GOS 109. For example, GOS 109 may be associated with a set of sector models 201, such as example sector models 201-1, 201-2, and 201-M. Further, GOS 109 may be associated with a set of MRU models 203, such as example MRU models 203-1, 203-2, and 203-L. Additionally, GOS 109 may be associated with a set of actions/parameters 205, such as example actions/parameters 205-1, 205-2, and 205-N.

GOS 109 may generate and/or modify sector models 201, MRU models 203, and/or actions/parameters 205 based on AI/ML techniques or other suitable techniques. For example, GOS 109 may generate, modify, refine, etc. sector models 201, MRU models 203, and/or actions/parameters 205 based on an evaluation of real-world data from sectors 101 and/or simulations of RF and/or interference metrics in a simulation and/or test environment. GOS 109 may further determine or identify correlations between respective sector models 201, MRU models 203, and/or actions/parameters 205 using AI/ML techniques or other suitable techniques.

Figure 3:
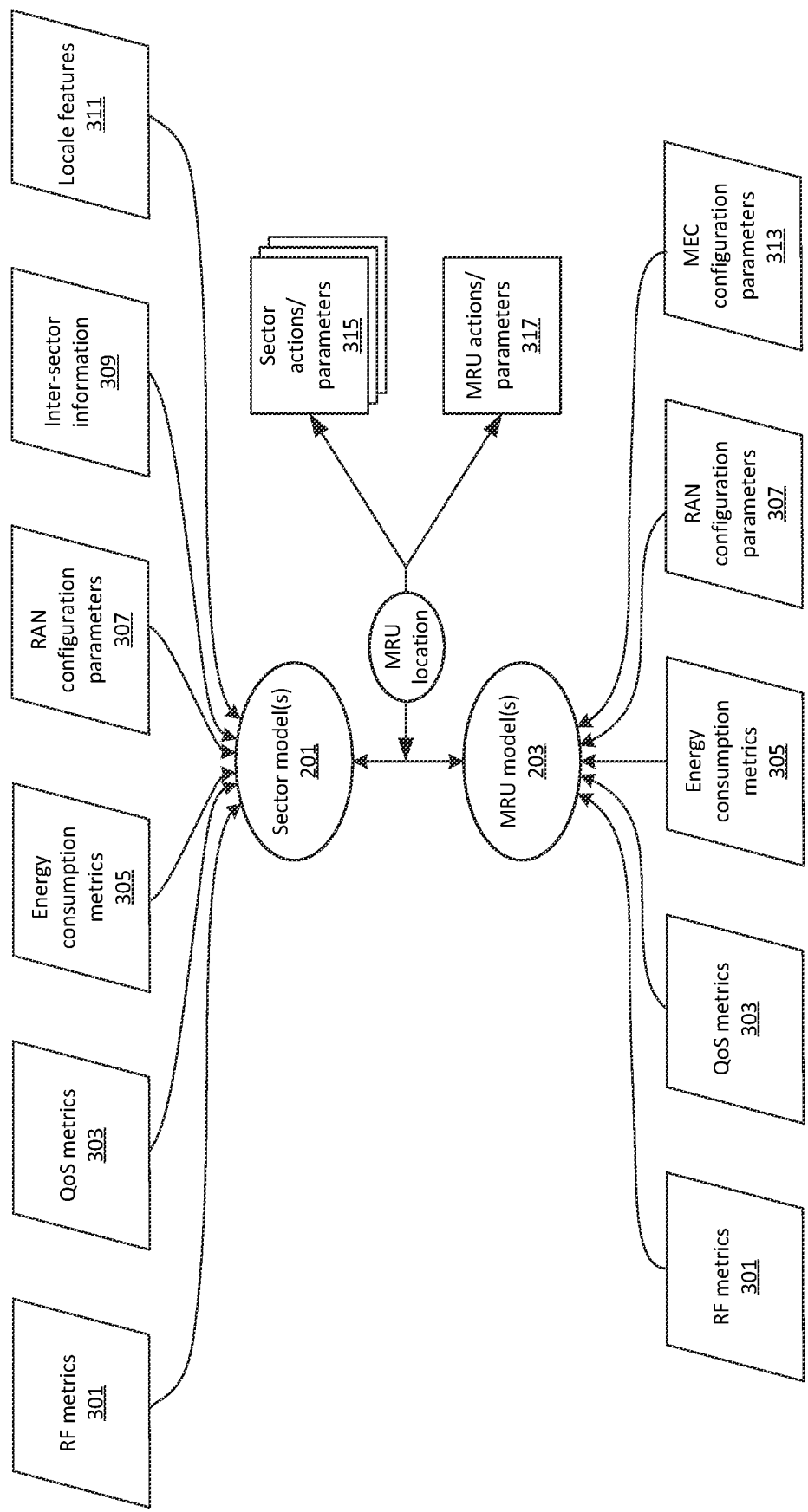
FIG. 3 illustrates example attributes associated with sector models and MRU models, and the location-based association of sector and MRU parameters with sector models and MRU models, in accordance with some embodiments.

For example, as shown in FIG. 3, sector model 201 (e.g., associated with a given sector 101) may include RF and/or interference metrics 301 (referred to simply as "RF metrics 301" for the sake of brevity), QoS metrics 303, energy consumption metrics 305, RAN configuration parameters 307, inter-sector information 309, locale features 311, and/or one or more other types of information.

RF metrics 301 associated with a given sector 101 may include metrics related to the propagation of RF signals from network infrastructure within sector 101 (or providing service to sector 101). For example, RF metrics 301 may include RSSI values, RSRP values, SINR values, CQI values, or other indicators of RF signal quality or strength. In some embodiments, RF metrics 301 may be determined by UEs or other RF signal-receiving devices located within or near (e.g., within a threshold distance of) sector 101.

For example, a given UE may be configured to scan for the presence of RF signals, such as reference signals, emitted by one or more base stations 103. The UE may, in some embodiments, generate one or more measurement reports, which may indicate a signal strength of such transmissions received from one or more base stations 103, and may further include an identifier of the base station(s) 103 from which such transmissions were received. The measurement reports may further include information regarding the transmissions themselves, such as a frequency (or range of frequencies) on which the RF signals were detected by the UE, as well as timing information (e.g., timing offsets, frame, time slot, etc.) associated with the RF signals. In this manner, the PRBs associated with the received RF signals may be indicated or derived from the measurement reports, where a particular PRB refers to a particular time-and-frequency slot in a time-and-frequency domain. A UE may also be configured to determine or report measures of interference, such as SINR, received RF signal power (e.g., at particular frequencies and/or time slots), or other measures of interference.

As noted above, GOS 109 may receive the measurement reports and/or other suitable RF metrics 301 from UEs (e.g., via an API or other suitable communication pathway), and/or from base stations 103 (e.g., via an X2 interface, Xn interface, or other suitable communication pathway, where base stations 103 may receive measurement reports from UEs via Radio Resource Control ("RRC") messaging or some other suitable communication pathway). In some embodiments, GOS 109 may receive RF metrics 301 from some other device or system.

Based on the received RF metrics 301, GOS 109 may determine a "baseline" or "expected" level of interference, received power, and/or other RF metrics in sector 101. As discussed below, such "baseline" or "expected" levels may be determined on a granular basis (e.g., based on locations or regions within given sectors 101, such as regions that are delineated by distance and angle from a reference point). Further, the "baseline" or "expected" RF or interference levels may be determined on a temporal basis, which may reflect fluctuations that vary on a periodic, repeating, or otherwise determinable basis (e.g., fluctuations based on weekday commutes, seasonal traffic, events at venues, or other phenomena). In this manner, sector model 201 may be determined for a given sector 101 based on temporal and/or spatial aspects of RF metrics 301. Additionally, or alternatively, different sector models 201 may be determined for sector 101 (e.g., for different times or time periods, and/or for different locations or regions within sector 101).

QoS metrics 303 may reflect QoS metrics associated with a particular sector 101 over a particular period of time. For example, QoS metrics 303 may include metrics relating to latency, bandwidth, jitter, packet loss, and/or other metrics related to network layer performance, application layer performance, or other "higher" layer performance (e.g., performance at a layer above a physical layer and/or a data link layer). QoS metrics 303 associated with a given sector 101 may be collected from and/or reported by UEs receiving wireless service within sector 101 and/or from a base station 103 located within sector 101, and/or may be received from base station 103 located in or providing wireless service to sector 101.

Energy consumption metrics 305 may indicate an amount of energy consumed at the particular sector 101 over the particular period of time. For example, energy consumption metrics 305 may indicate an amount of electrical power (e.g., kilowatt-hours or some other measure of consumed power) consumed by network infrastructure elements (e.g., base stations 103, data centers, routers, hubs, and/or other equipment) within or serving sector 101 over a given period of time.

RAN configuration parameters 307 may include parameters such as an indication of quantity and/or position (e.g., geographical position) of physical infrastructure hardware (e.g., antennas, radios, data centers, or the like) associated with one or more RANs in sector 101. In some embodiments, RAN configuration parameters 307 may indicate particular radio access technologies ("RATs") implemented in sector 101 (e.g., a LTE RAT, a 5G RAT, etc.), beam configurations implemented in sector 101 (e.g., beam quantity, beam azimuth angles, beam width, beam transmission power, etc.), antenna sensitivity (e.g., receive sensitivity), MIMO configuration information, and/or other suitable information. In some embodiments, RAN configuration parameters 307 may indicate the height of one or more antennas associated with one or more base stations 103 (or other RF-emitting equipment), a coverage area of one or more antennas (e.g., a polygon, distance from a reference point, or other descriptor of geographical regions in which RF signals are received from the one or more antennas), or other parameters of the one or more antennas.

In some embodiments, RAN configuration parameters 307 may include information indicating a capacity or other capability of a given sector 101 and/or one or more base stations 103 located in (or providing service to) sector 101. For example, RAN configuration parameters 307 may indicate an RF channel bandwidth within sector 101, an amount of available and/or used PRBs associated with one or more base stations 103 located in (or providing service to) sector 101, threshold quantities of supported UEs simultaneously connected to one or more base stations 103 located in (or providing service to) sector 101, threshold amounts of data or throughput that may be sent and/or received by one or more base stations 103 located in (or providing service to) sector 101, and/or other capability and/or capacity-related information.

Inter-sector information 309 may include information associated with sectors adjacent to or proximate to a given sector 101. For example, inter-sector information 309 may include RF metrics, RAN parameters, QoS metrics, and/or energy consumption metrics, associated with sectors adjacent to or within a threshold distance of sector 101. In some embodiments, inter-sector information 309 may include mobility information, which may be associated with mobility of UEs between sector 101 and neighboring sectors. For example, inter-sector information 309 may indicate that UEs that are located in sector 101 are likely to be stationary within sector 101 for a first duration of time (e.g., approximately one hour), and then that such UEs travel to a particular neighboring sector. As another example, inter-sector information 309 may indicate that UEs that are located in the neighboring sector are relatively likely to enter the particular sector 101.

Locale features 311 may include information indicating attributes and/or features of the geographical area. For example, locale features 311 may include information relating to building layout and/or density, topographical features (e.g., mountains, valleys, forests, streams, etc.), weather-related information, air quality-related information (e.g., smog density, particulate density, fog density, etc.), and/or other factors that may affect RF metrics, energy consumption metrics, QoS metrics, or other metrics. Locale features 311 may include geographical coordinates (e.g., latitude and longitude coordinates, Global Positioning System ("GPS") coordinates, or the like) or other suitable location information, to indicate the geographical locations of respective features.

As described below, a given sector 101 may be associated with one or more sector models 201 based on a comparison of the above-described factors, and/or one or more other factors, of sector 101 to such factors associated with a set of candidate sector models 201. Briefly, for example, GOS 109 may determine that a particular sector 101, that exhibits a particular set of RF metrics 301, a particular set of QoS metrics 303, a particular set of energy consumption metrics 305, and a first set of locale features 311 (e.g., urban features such as high-rise buildings) is associated with a first sector model 201, while another sector 101, that exhibits a similar set of RF metrics 301, a similar set of QoS metrics 303, and a similar set of energy consumption metrics 305, but a different second set of locale features 311 (e.g., rural features such as relatively flat areas with relatively low building density) is associated with a different second sector model 201.

Generally, a given sector model 201 may describe or reflect parameters, metrics, attributes, etc. of a given sector 101. As noted above, a particular sector model 201 may include temporal or location-based fluctuations or variations, and/or different sector models 201 may be associated with a given sector 101 at different times or regions within sector 101.

MRU models 203 may indicate attributes, characteristics, capability information, etc. associated with one or more MRUs 105. For example, different MRUs 105 may have different types of hardware (e.g., RAN infrastructure hardware, such as antennas; processing hardware; and/or other types of hardware resources). As another example, MRUs 105 may have different configuration parameters available at differing times of day or based on other temporal factors. For example, a given MRU 105 may be configured to implement, or make available, wireless coverage associated with a particular set of bands during a first time period, while MRU 105 may be configured to not make the particular set of bands available during a second time period. As another example, a given MRU 105 may be may be configured to implement, or make available, wireless coverage associated with a particular set of bands when MRU 105 is located at a first location, while MRU 105 may be configured to not make the particular set of bands available at a second location (e.g., near an airport, near a law enforcement facility, etc.). As such, different MRUs 105 may be associated with different MRU models 203, and/or the same MRU 105 may be associated with different MRU models 203 (e.g., at different times, at different locations, etc.).

Similar to sector models 201, MRU model 203 may include and/or may be based on RF metrics 301, QoS metrics 303, and/or energy consumption metrics 307. For example, as similarly discussed above, such information 301-307, associated with a given MRU model 203, may indicate and/or may be based on measured, simulated, and/or configured values associated with a given MRU 105. Further, MRU model 203 may include MEC configuration parameters 313, which may indicate, for example, a load and/or capacity associated with one or more MECs with which a given MRU 105 is associated. For example, MEC configuration parameters may indicate an amount of MEC processing resources that are used and/or available at MRU 105, an amount of MEC memory resources that are used and/or available at MRU 105, an amount of MEC storage resources that are used and/or available at MRU 105, a set of applications and/or services that are installed or that may be installed at a MEC associated with MRU 105, and/or other MEC configuration or performance information.

In some embodiments, GOS 109 may determine a set of actions/parameters 205, which may include actions/parameters 315 for one or more sectors 101 and a set of actions/parameters 317 for MRU 105, based on respective sector models 201, MRU model 203, and a location of MRU 105 (e.g., within a given sector 101). That is, one or more sets of sector actions/parameters 315 and MRU actions/parameters 317 may be associated with a set of sector models 201, MRU models 203, and MRU location. Thus, when MRU 105 is located at a particular location (e.g., within a particular sector 101), configuration parameters for MRU 105 and one or more base stations 103 may be associated with sector models 201 associated with the particular sector 101 in which MRU 105 is located, and with one or more other sectors 101 (e.g., sectors 101 that are adjacent to or are otherwise proximate to the particular sector 101 in which MRU 105 is located).

For example, a set of sector models 203, associated with a set of sectors 101, may indicate relatively poor RF metrics 301 at a particular location within a particular sector 101. Thus, sector actions/parameters 315, associated with the given location within the particular sector 101 (e.g., associated with sector models 203 and the location within sector 101), may include actions/parameters such as configuring base stations 103 in the particular sector 101 and/or surrounding sectors 101 to forward traffic to MRU 105 instead of directly to one or more UEs. In other words, base stations 103 may be configured to use MRU 105 as a relay between base stations 103 and one or more UEs. Similarly, in this example, sector models 201 and MRU model 203 may be associated with MRU actions/parameters 317, which may include configuring MRU 105 to act as a relay between base stations 103 and one or more UEs.

As another example, sector models 203 may indicate relatively poor QoS metrics 303 (e.g., latency above a threshold, throughput below a threshold, etc.) and relatively strong RF metrics 301 (e.g., RSSI above a threshold, SINR above a threshold, etc.) at a given location. In this example, sector actions/parameters 315 may include configuring base stations 103 in a particular sector 101 and/or surrounding sectors 101 to forward traffic to a core network via MRU 105 instead of via some other backhaul link. In other words, base stations 103 may be configured to use MRU 105 as a wireless relay (e.g., as an IAB node) between base stations 103 and the core network. Similarly, in this example, sector models 201 and MRU model 203 may be associated with MRU actions/parameters 317, which may include configuring MRU 105 to act as a relay between base stations 103 and the core network.

As yet another example, sector models 203 may indicate that a particular location within a particular sector 101 is a "low mobility" location, in which UEs tend to remain for a relatively long time (e.g., at least a threshold amount time). In this example, sector actions/parameters 315 may include configuring base stations 103 in the particular sector 101 and/or surrounding sectors 101 to include MRU 105 in a NCL provided by base stations 103, and/or to rank MRU 105 as a highest ranking neighbor cell in the NCL (and/or to otherwise modify a ranking or score of MRU 105 in the NCL) based on the "low mobility" determination associated with the location. Similarly, in this example, sector models 201 and MRU model 203 may be associated with MRU actions/parameters 317, which may include configuring MRU 105 to serve as a base station of a RAN that includes base stations 103 of sectors 101.

As another example, sector models 203 may indicate that a particular location within a particular sector 101 is a location at which a relatively large amount of video streaming traffic is sent and/or received by UEs located at the location. In this example, sector actions/parameters 315 may include configuring base stations 103 in the particular sector 101 and/or surrounding sectors 101 to perform carrier aggregation and/or to modify beamforming parameters in order to implement beams that do not overlap with the location, and/or where such modification reduces wireless coverage of base stations 103 at the location. Additionally, MRU actions/parameters 317 may include configuring a beamforming configuration of MRU 105 to provide wireless coverage at the location. As a result, the beams implemented by base stations 103 and MRU 105 may be more tightly focused, thus providing enhanced coverage at respective coverage areas, including the particular location of MRU 105 as well as surrounding locations within sector 101 (and/or surrounding sectors 101).

As a further example, sector actions/parameters 315 and/or MRU actions/parameters 317 may include a coordinated determination of one or more frequencies, bands, etc. to utilize. For example, in some embodiments, sector actions/parameters 315 and MRU actions/parameters 317 may include a configuration of base stations 103 and MRU 105 to utilize the same frequencies, bands, etc., such as in situations where coverage areas of base stations 103 and MRU 105 do not significantly overlap (e.g., as indicated by sector models 201 and MRU model 203). As another example, in situations where coverage areas of base stations 103 and MRU overlap, base stations 103 and MRU 105 may be configured to utilize differing frequencies, bands, etc. (e.g., in order to reduce collisions, interference, etc.).

Figure 4:
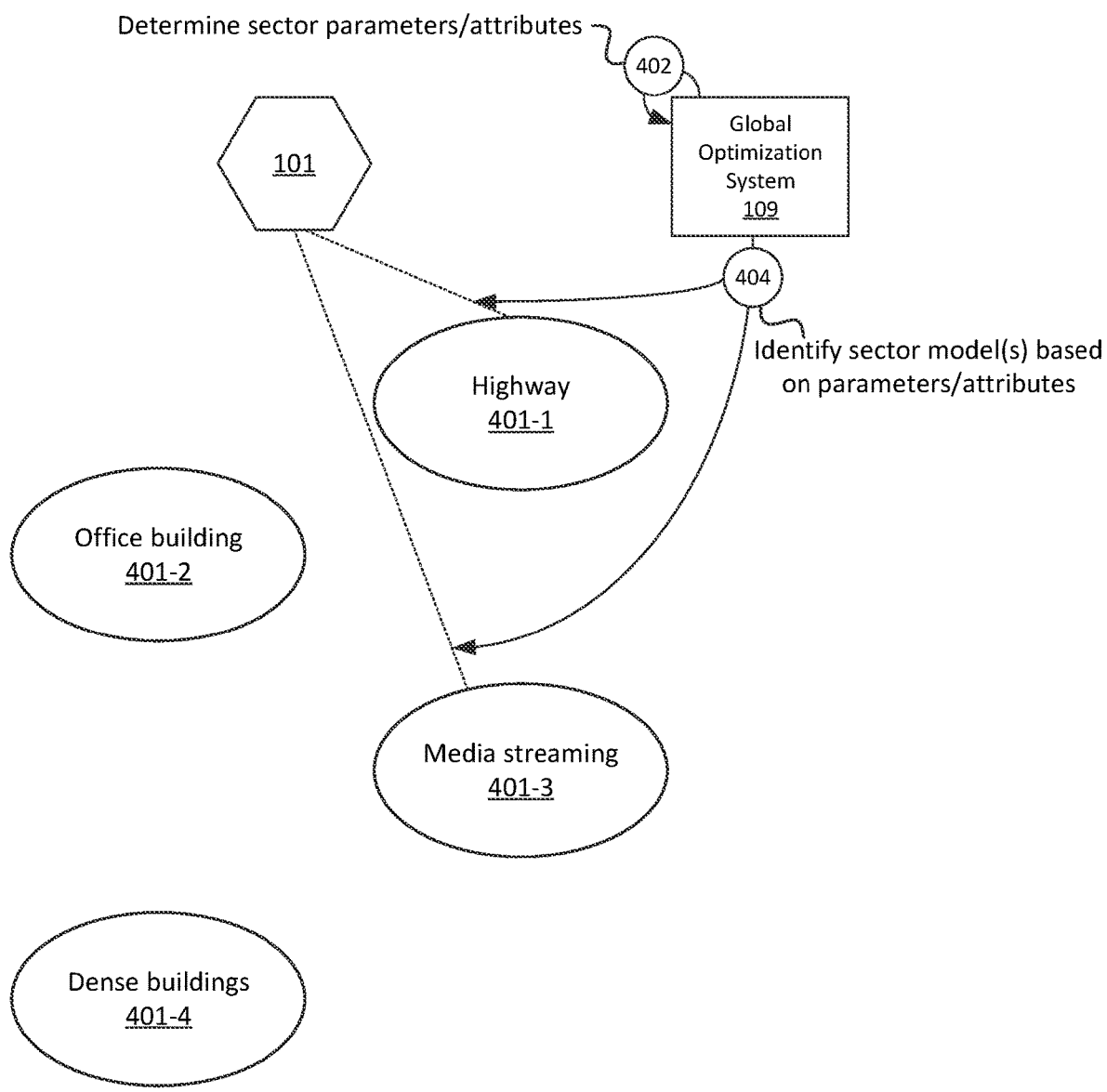
FIG. 4 illustrates an example of one or more sector models associated with a given sector associated with a RAN of a wireless network, in accordance with some embodiments.

FIG. 4 illustrates an example determination of one or more sector models 201 for a particular sector 101. As shown, GOS 109 may determine (at 402) parameters and/or attributes of sector 101. As discussed above, such parameters and/or attributes may include RF metrics 301, QoS metrics 303, energy consumption metrics 305, RAN configuration parameters 307, inter-sector information 309, locale features 311, and/or other suitable parameters, attributes, metrics, or the like. GOS 109 may further identify (at 404) one or more sector models 201 based on the determined parameters and/or attributes of sector 101.

In this example, GOS 109 may determine that sector 101 is associated with a "highway" sector model 401-1 and a "media streaming" sector model 401-3. As further shown, GOS 109 may not determine that sector 101 is associated with an example "office building" sector model 401-2, or an example "dense buildings" sector model 401-4. For example, GOS 109 may determine, based on a suitable similarity analysis of the parameters and/or attributes of sector 101, that sector models 401-2 and 401-4 do not match (e.g., correspond with a measure of similarity above a threshold measure of similarity) sector 101, and/or that sector models 401-1 and 401-3 match (e.g., have a higher measure of similarity with) the parameters and/or attributes of sector 101 more closely. As discussed above, operations 402 and 404 may be performed on an ongoing basis, such that the selection of particular sector models 401 may change based on updated parameters and/or attributes received by GOS 109 over time.

Figure 5:
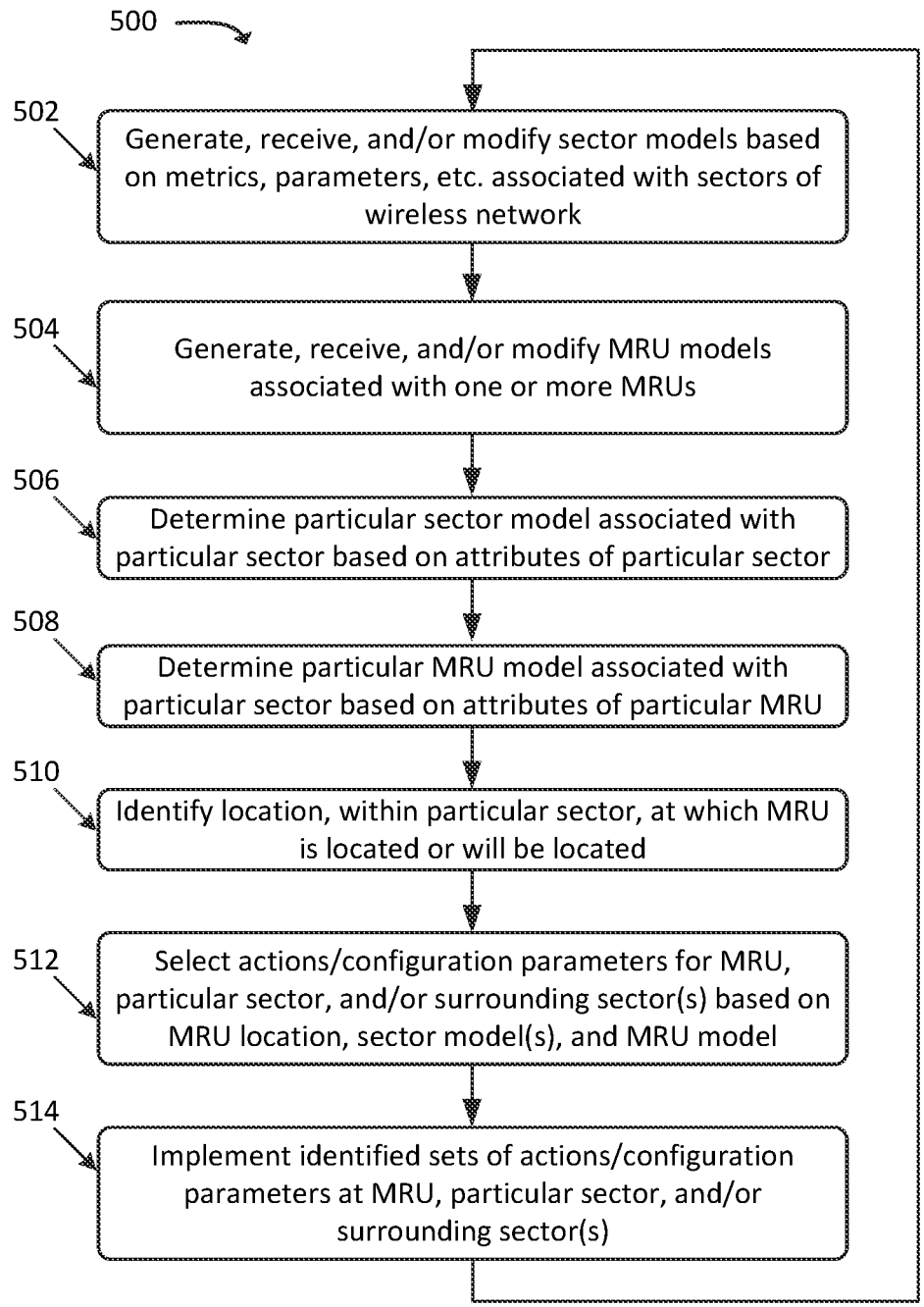
FIG. 5 illustrates an example process for configuring elements of a RAN and an MRU based on sector models, MRU models, and a location of the MRU, in accordance with some embodiments.

FIG. 5 illustrates an example process 500 for configuring elements of a RAN and an MRU based on sector models 201, MRU models 203, and a location of a particular MRU 105. In some embodiments, some or all of process 500 may be performed by GOS 109. In some embodiments, one or more other devices may perform some or all of process 500 in concert with, and/or in lieu of, GOS 109, such as one or more devices or systems associated with one or more sectors 101 and/or MRU 105.

As shown, process 500 may include generating, receiving, and/or modifying (at 502) one or more sector models 201 based on metrics, parameters, etc. associated with one or more sectors 101 of a wireless network. For example, as discussed above, GOS 109 may use AI/ML techniques or other suitable techniques to generate and/or refine sector models 201. For example, GOS 109 may evaluate metrics based on real-word and/or simulated KPIs and/or attributes of one or more sectors 101 in order to generate one or more clusters, classifications, or the like, which may be reflected by sector models 201.

Process 500 may further include generating, receiving, and/or modifying (at 504) one or more MRU models 203 associated with one or more MRUs 105. For example, as discussed above, GOS 109 may use AI/ML techniques or other suitable techniques to generate and/or refine MRU models 203. For example, GOS 109 may evaluate metrics based on real-word and/or simulated KPIs and/or attributes of one or more MRUs 105 in order to generate one or more clusters, classifications, or the like, which may be reflected by MRU models 203.

Process 500 may additionally include determining (at 506) a particular sector model associated with a particular sector 101 of a RAN based on attributes of the particular sector 101. For example, as discussed above, GOS 109 may receive information associated with sector 101, such as RF metrics 301, QoS metrics 303, energy consumption metrics 305, RAN configuration parameters 307, inter-sector information 309, locale features 311, and/or other suitable information, which GOS 109 may compare to attributes of one or more sector models 201, in order to determine one or more particular sector models 201 associated with sector 101. For example, as discussed above, GOS 109 may use one or more AI/ML techniques to determine an association, correlation, or the like between the attributes associated with sector 101 and one or more sector models 201. For example, GOS 109 may select a particular sector model 201 from a set of candidate sector models 201, and/or may generate a new sector model 201 based on the attributes of sector 101.

Process 500 may also include determining (at 508) a particular MRU model associated with a one or more MRUs 105. For example, as discussed above, GOS 109 may receive information associated with a given MRU 105, such as RF metrics 301, QoS metrics 303, energy consumption metrics 305, RAN configuration parameters 307, MEC configuration parameters 313, and/or other suitable information, which GOS 109 may compare to attributes of one or more sector models 201, in order to determine one or more particular MRU models 203 associated with MRU 105. For example, as discussed above, GOS 109 may use one or more AI/ML techniques to determine an association, correlation, or the like between the attributes associated with MRU 105 and one or more MRU models 203. For example, GOS 109 may select a particular MRU model 203 from a set of candidate MRU models 203, and/or may generate a new MRU model 203 based on the attributes of MRU 105.

Process 500 may additionally include identifying (at 510) a geographical location, within a particular sector 101, at which MRU 105 is located or will be located. For example, GOS 109 may receive (e.g., from MRU 105, from a given base station 103 that is communications range of MRU 105, and/or some other device or system) that MRU 105 is located at a particular geographical location within a given sector 105. Additionally, or alternatively, GOS 109 and/or some other device or system may utilize AI/ML techniques or other suitable techniques to predict (e.g., based on historical information associated with MRU 105 and/or with sector 101) that MRU 105 will be located at the geographical location within sector 101 at a certain time or time range.

Process 500 may additionally include selecting (at 512) configuration parameters for MRU 105, sector 101 (e.g., the particular sector 101 in which MRU 105 is located or will be located), and/or one or more other sectors (e.g., sectors 101 adjacent to particular sector 101, sectors 101 within a threshold proximity of particular sector 101, sectors 101 within communications range of one or more base stations 103 of particular sector 101, and/or one or more other sectors 101). GOS 109 may select such parameters 315 and/or 317 for sector(s) 101 and/or MRU 105 further based on the geographical location at which MRU 105 is located or will be located. For example, as discussed above, differing sets of actions/parameters 315 and/or 317 may be associated with different sets of sector models 201, MRU models 203, and particular geographical locations (e.g., within sectors 101) of MRU 105. In this manner, the configurations of sectors 101 and MRU 105 may be complementary and coordinated in a manner that optimizes the operation of a RAN implemented by base stations 103 of sectors 101 and MRU 105.

Process 500 may further include implementing (at 514) the identified set of actions. For example, as discussed above, sectors 101 may make one or more configs or adjustments to parameters (e.g., frequency and/or band selection parameters, MEC routing parameters, slice-specific parameters, NCL and/or other mobility parameters, backhaul parameters, and/or other parameters), physical devices (e.g., antennas), or the like based on the identified set of sector actions/parameters 315. Additionally, MRU 105 may make one or more configs or adjustments to parameters (e.g., frequency and/or band selection parameters, MEC routing parameters, slice-specific parameters, NCL and/or other mobility parameters, backhaul parameters, and/or other parameters), physical devices (e.g., antennas), or the like based on the identified set of MRU actions/parameters 317.

As shown in FIG. 5, some or all of process 500 may be performed and/or repeated iteratively. For example, some or all of operations 502-514 may be repeated and/or performed, in order to continuously remediate potential RF interference within a given sector 101. That is, the results of implementing (at 514) particular actions in response to particular sector models 201 and MRU models 203 may be evaluated (e.g., based on continued monitoring (at 502 and 504) or RAN and/or MRU metrics). Further, the associations between sector models 201, MRU 203, and sets of actions/parameters 315 and/or 317 may be modified (e.g., strengthened or weakened) based on whether particular actions/parameters 315 and/or 317 improved performance, reliability, or the like within sector 101 and/or surrounding sectors 101.

Figure 6:
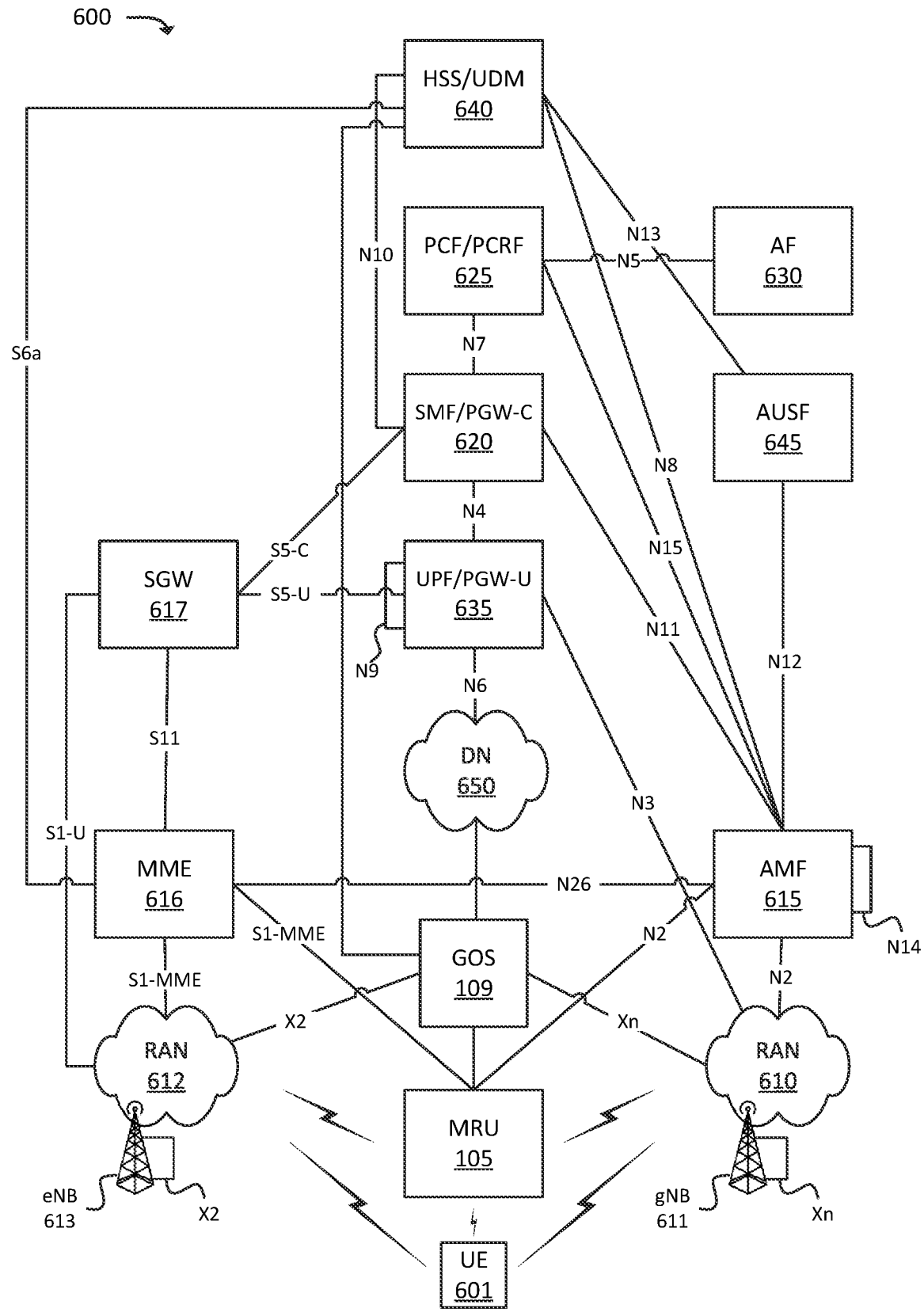
FIG. 6 illustrates an example environment in which one or more embodiments, described herein, may be implemented.

FIG. 6 illustrates an example environment 600, in which one or more embodiments may be implemented. In some embodiments, environment 600 may correspond to a 5G network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). As shown, environment 600 may include UE 601, RAN 610 (which may include one or more Next Generation Node Bs ("gNBs") 611), RAN 612 (which may include one or more one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/Packet Data Network ("PDN") Gateway ("PGW")-Control plane function ("PGW-C") 620, Policy Control Function ("PCF")/Policy Charging and Rules Function ("PCRF") 625, Application Function ("AF") 630, User Plane Function ("UPF")/PGW-User plane function ("PGW-U") 635, Home Subscriber Server ("HSS")/Unified Data Management ("UDM") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650), such as GOS 109 and/or MRU 105, which may perform operations as described above.

The example shown in FIG. 6 illustrates one instance of each network component or function (e.g., one instance of SMF/PGW-C 620, PCF/PCRF 625, UPF/PGW-U 635, HSS/UDM 640, and/or AUSF 645). In practice, environment 600 may include multiple instances of such components or functions. For example, in some embodiments, environment 600 may include multiple "slices" of a core network, where each slice includes a discrete set of network functions (e.g., one slice may include a first instance of SMF/PGW-C 620, PCF/PCRF 625, UPF/PGW-U 635, HSS/UDM 640, and/or AUSF 645, while another slice may include a second instance of SMF/PGW-C 620, PCF/PCRF 625, UPF/PGW-U 635, HSS/UDM 640, and/or AUSF 645). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 601 may include a computation and communication device, such as a wireless mobile communication device that is capable of communicating with RAN 610, RAN 612, and/or DN 650. UE 601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 601 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 601 may communicate with one or more other elements of environment 600. UE 601 may communicate with RAN 610 via an air interface (e.g., as provided by gNB 611). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, AMF 615, and/or one or more other devices or networks) and may communicate the traffic to UE 601 via the air interface. In some embodiments, base station 103 and/or MRU 105 may be, may include, may be implemented by, and/or may be communicatively coupled to one or more gNBs 611.

RAN 612 may be, or may include, a LTE RAN that includes one or more base stations (e.g., one or more eNBs 613), via which UE 601 may communicate with one or more other elements of environment 600. UE 601 may communicate with RAN 612 via an air interface (e.g., as provided by eNB 613). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, SGW 617, and/or one or more other devices or networks) and may communicate the traffic to UE 601 via the air interface. In some embodiments, base station 103 and/or MRU 105 may be, may include, may be implemented by, and/or may be communicatively coupled to one or more eNBs 613.

AMF 615 may include one or more devices, systems, Virtualized Network Functions ("VNFs"), etc., that perform operations to register UE 601 with the 5G network, to establish bearer channels associated with a session with UE 601, to hand off UE 601 from the 5G network to another network, to hand off UE 601 from the other network to the 5G network, manage mobility of UE 601 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, etc., that perform operations to register UE 601 with the EPC, to establish bearer channels associated with a session with UE 601, to hand off UE 601 from the EPC to another network, to hand off UE 601 from another network to the EPC, manage mobility of UE 601 between RANs 612 and/or eNBs 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate the establishment of communication sessions on behalf of UE 601. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 601, from DN 650, and may forward the user plane data toward UE 601 (e.g., via RAN 610, SMF/PGW-C 620, and/or one or more other devices). In some embodiments, multiple UPFs 635 may be deployed (e.g., in different geographical locations), and the delivery of content to UE 601 may be coordinated via the N9 interface (e.g., as denoted in FIG. 6 by the line marked "N9" originating and terminating at UPF/PGW-U 635). Similarly, UPF/PGW-U 635 may receive traffic from UE 601 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 601.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 601 may communicate, through DN 650, with data servers, other UEs 601, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 601 may communicate.

Figure 7:
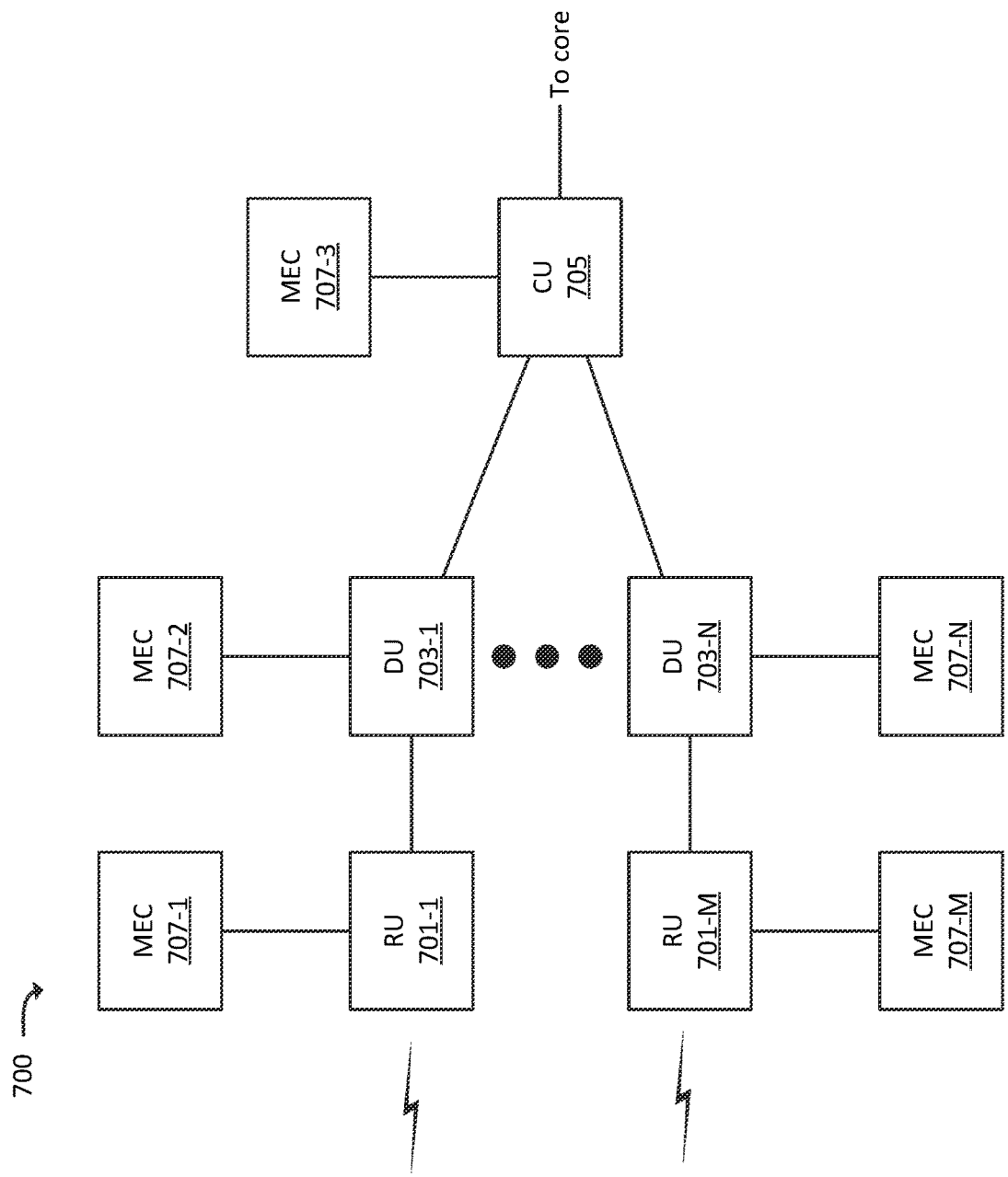
FIG. 7 illustrates an example arrangement of a radio access network ("RAN"), in accordance with some embodiments.

FIG. 7 illustrates an example Distributed Unit ("DU") network 700, which may be included in and/or implemented by one or more RANs (e.g., RAN 610, RAN 612, or some other RAN) and/or MRU 105. In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. In some embodiments, MRU 105 may implement DU network 700 and/or one or more elements thereof.

As shown, DU network 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 601 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 601, and may determine which DU(s) 703 should receive the downlink traffic. DU 703 may include one or more devices that transmit traffic between a core network (e.g., via CU 705) and UE 601 (e.g., via a respective RU 701). DU 703 may, for example, receive traffic from RU 701 at a first layer (e.g., physical ("PHY") layer traffic, or lower PHY layer traffic), and may process/ aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 601.

RU 701 may include hardware circuitry (e.g., one or more RF transceivers, antennas, radios, and/or other suitable hardware) to communicate wirelessly (e.g., via an RF interface) with one or more UEs 601, one or more other DUs 703 (e.g., via RUs 701 associated with DUs 703), and/or any other suitable type of device. In the uplink direction, RU 701 may receive traffic from UE 601 and/or another DU 703 via the RF interface and may provide the traffic to DU 703. In the downlink direction, RU 701 may receive traffic from DU 703, and may provide the traffic to UE 601 and/or another DU 703.

RUs 701 may, in some embodiments, be communicatively coupled to one or more MECs 707. For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, CU 705 may be communicatively coupled to MEC 707-3, and so on. MECs 707 may include hardware resources (e.g., configurable or provisionable hardware resources) that may be configured to provide services and/or otherwise process traffic to and/or from UE 601, via a respective RU 701. In some embodiments, a given MRU 105 may include and/or implement a particular RU 701 and/or one or more MECs 707.

In some embodiments, RU 701-1 may route some traffic, from UE 601, to MEC 707-1 instead of to a core network (e.g., via DU 703 and CU 705). MEC 707-1 may process the traffic, perform one or more computations based on the received traffic, and may provide traffic to UE 601 via RU 701-1. In this manner, ultra-low latency services may be provided to UE 601, as traffic does not need to traverse DU 703, CU 705, and an intervening backhaul network between DU network 700 and the core network.

Figure 8:
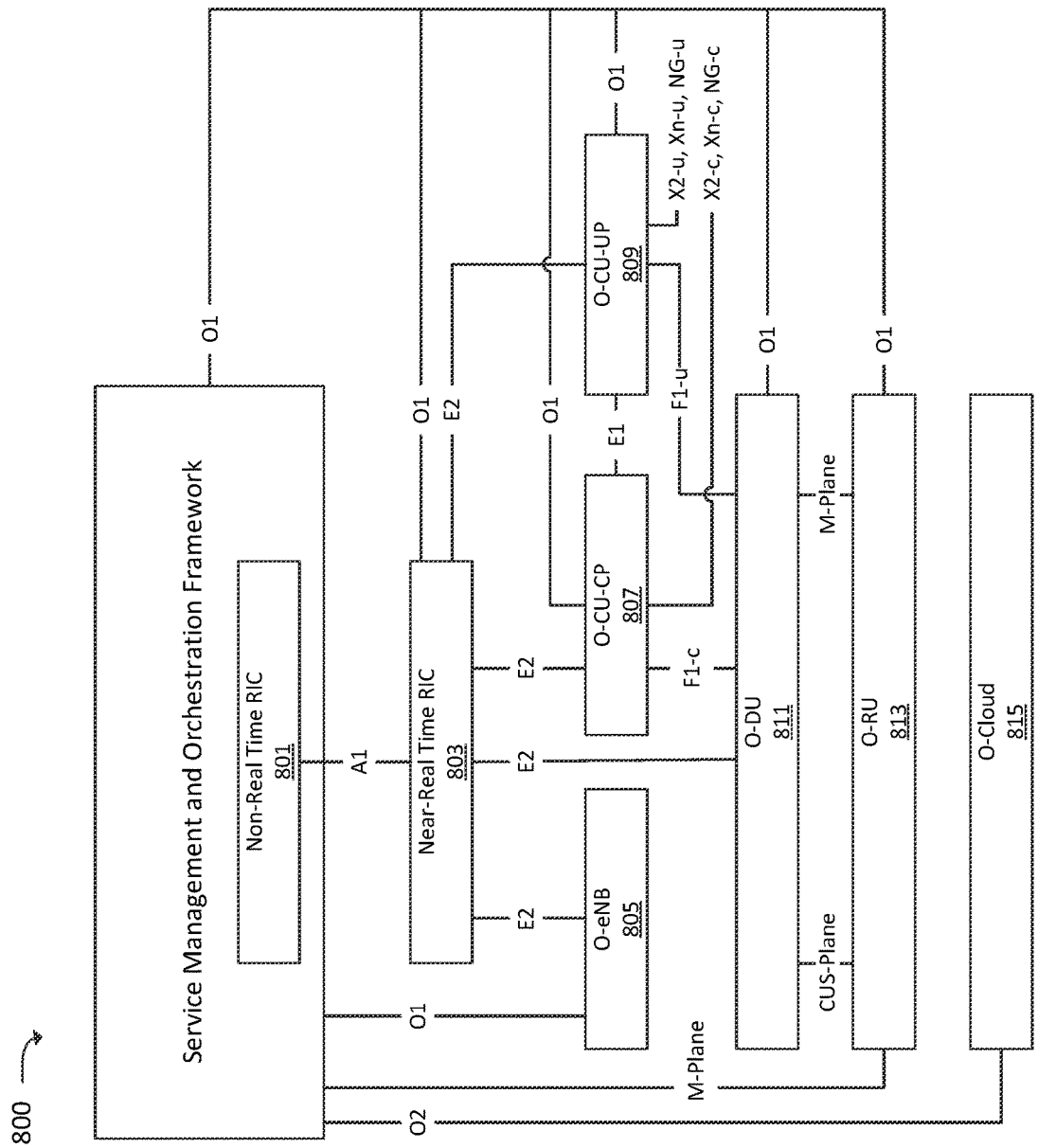
FIG. 8 illustrates an example arrangement of an Open RAN ("O-RAN") environment in which one or more embodiments, described herein, may be implemented.

FIG. 8 illustrates an example O-RAN environment 800, which may correspond to RAN 610, RAN 612, and/or DU network 700. For example, RAN 610, RAN 612, MRU 105, and/or DU network 700 may include one or more instances of O-RAN environment 800, and/or one or more instances of O-RAN environment 800 may implement RAN 610, RAN 612, DU network 700, and/or some portion thereof. As shown, O-RAN environment 800 may include Non-Real Time Radio Intelligent Controller ("RIC") 801, Near-Real Time RIC 803, O-eNB 805, O-CU-Control Plane ("O-CU-CP") 807, O-CU-User Plane ("O-CU-UP") 809, O-DU 811, O-RU 813, and O-Cloud 815. In some embodiments, O-RAN environment 800 may include additional, fewer, different, and/or differently arranged components.

In some embodiments, some or all of the elements of O-RAN environment 800 may be implemented by one or more configurable or provisionable resources, such as virtual machines, cloud computing systems, physical servers, and/or other types of configurable or provisionable resources. In some embodiments, some or all of O-RAN environment 800 may be implemented by, and/or communicatively coupled to, one or more MECs 707.

Non-Real Time RIC 801 and Near-Real Time RIC 803 may receive performance information (and/or other types of information) from one or more sources, and may configure other elements of O-RAN environment 800 based on such performance or other information. For example, Near-Real Time RIC 803 may receive performance information, via one or more E2 interfaces, from O-eNB 805, O-CU-CP 807, and/or O-CU-UP 809, and may modify parameters associated with O-eNB 805, O-CU-CP 807, and/or O-CU-UP 809 based on such performance information. Similarly, Non-Real Time RIC 801 may receive performance information associated with O-eNB 805, O-CU-CP 807, O-CU-UP 809, and/or one or more other elements of O-RAN environment 800 and may utilize machine learning and/or other higher level computing or processing to determine modifications to the configuration of O-eNB 805, O-CU-CP 807, O-CU-UP 809, and/or other elements of O-RAN environment 800. In some embodiments, Non-Real Time RIC 801 may generate machine learning models based on performance information associated with O-RAN environment 800 or other sources, and may provide such models to Near-Real Time RIC 803 for implementation.

O-eNB 805 may perform functions similar to those described above with respect to eNB 613. For example, O-eNB 805 may facilitate wireless communications between UE 601 and a core network. O-CU-CP 807 may perform control plane signaling to coordinate the aggregation and/or distribution of traffic via one or more DUs 703, which may include and/or be implemented by one or more O-DUs 811, and O-CU-UP 809 may perform the aggregation and/or distribution of traffic via such DUs 703 (e.g., O-DUs 811). O-DU 811 may be communicatively coupled to one or more RUs 701, which may include and/or may be implemented by one or more O-RUs 813. In some embodiments, O-Cloud 815 may include or be implemented by one or more MECs 707, which may provide services, and may be communicatively coupled, to O-CU-CP 807, O-CU-UP 809, O-DU 811, and/or O-RU 813 (e.g., via an O1 and/or O2 interface).

Figure 9:
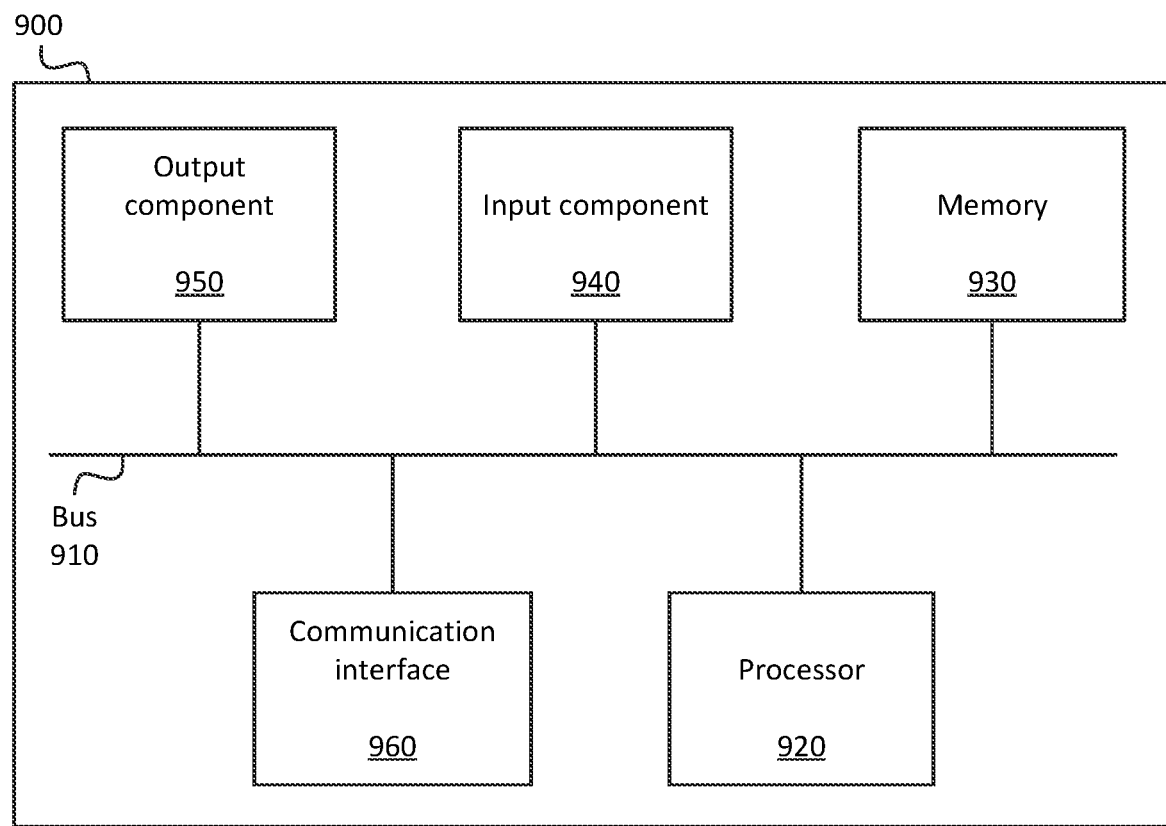
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory 9 device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A, 1B, and 2-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   generate a plurality of sector models, wherein each sector model, of the plurality of sector models, is associated with a respective set of radio access network ("RAN") attributes;
   generate a plurality of mobile radio unit ("MRU") models, wherein each MRU model, of the plurality of MRU models, is associated with a respective set of MRU attributes;
   identify a particular MRU, wherein the particular MRU provides wireless connectivity to a core network, wherein the particular MRU includes a first Multi-Access/Mobile Edge Computing ("MEC") device and mobility apparatus that facilitates mobility of the particular MRU, wherein identifying the particular MRU includes identifying a set of attributes of the particular MRU;
   compare the attributes of the particular MRU to MRU attributes included in the plurality of MRU models;
   select a particular MRU model, of the plurality of MRU models, based on the comparing;
   determine, based on historical information associated with the MRU, a predicted geographical location of the MRU at a particular time;
   identify, based on the predicted geographical location of the particular MRU, RAN attributes of a RAN that is associated with the predicted geographical location and that provides wireless connectivity to the core network;
   select a particular sector model, of the plurality of sector models, based on the RAN attributes of the RAN associated with the predicted geographical location of the particular MRU;
   determine, based on the particular MRU model and the particular set of sector models:
      a first set of configuration parameters for one or more base stations associated with the RAN associated with the predicted geographical location of the MRU, wherein a particular base station, of the one or more base stations, is associated with a second MEC, and
      a second set of configuration parameters for the particular MRU,
      wherein determining at least one of the first or second sets of configuration parameters includes configuring the particular base station to forward traffic to the particular MRU for processing by the first MEC in lieu of processing the traffic at the second MEC associated with the particular base station;
   implement the first set of configuration parameters at the one or more base stations of the particular sector at the particular time; and
   implement the second set of configuration parameters at the particular MRU at the particular time.

2. The device of claim 1, wherein determining at least one of the first or second sets of configuration parameters further includes:
   determining, based on the set of sector models, that radio frequency ("RF") metrics associated with the predicted geographical location of the particular MRU are below a threshold level of RF metrics; and
   configuring, based on determining that RF metrics associated with the predicted geographical location of the particular MRU are below the threshold level of RF metrics, the particular MRU as a wireless repeater associated with the one or more base stations.

3. The device of claim 2, wherein configuring the particular MRU as the wireless repeater includes:
   configuring at least one base station, of the one or more base stations, to forward wireless traffic, associated with a UE, to the particular MRU in lieu of forwarding the wireless traffic to the UE via wireless coverage provided by the at least one base station.

4. The device of claim 1, wherein determining at least one of the first or second sets of configuration parameters further includes:
configuring the particular MRU as a wireless backhaul device associated with the one or more base stations.

5. The device of claim 4, wherein configuring the particular MRU as the wireless backhaul device includes:
configuring at least a particular base station, of the one or more base stations, to forward wireless traffic to the particular MRU in lieu of forwarding the wireless traffic to the core network.

6. A non-transitory computer-readable medium, storing a plurality of processor-executable instructions to:
generate a plurality of sector models, wherein each sector model, of the plurality of sector models, is associated with a respective set of radio access network ("RAN") attributes;
generate a plurality of mobile radio unit ("MRU") models, wherein each MRU model, of the plurality of MRU models, is associated with a respective set of MRU attributes;
identify a particular MRU, wherein the particular MRU provides wireless connectivity to a core network, wherein the particular MRU includes a first Multi-Access/Mobile Edge Computing ("MEC") device and mobility apparatus that facilitates mobility of the particular MRU, wherein identifying the particular MRU includes identifying a set of attributes of the particular MRU;
compare the attributes of the particular MRU to MRU attributes included in the plurality of MRU models;
select a particular MRU model, of the plurality of MRU models, based on the comparing;
determine, based on historical information associated with the MRU, a predicted geographical location of the MRU at a particular time;
identify, based on the predicted geographical location of the particular MRU, RAN attributes of a RAN that is associated with the predicted geographical location and that provides wireless connectivity to the core network;
select a particular sector model, of the plurality of sector models, based on the RAN attributes of the RAN associated with the predicted geographical location of the particular MRU;
determine, based on the particular MRU model and the particular set of sector models:
a first set of configuration parameters for one or more base stations associated with the RAN associated with the predicted geographical location of the MRU, wherein a particular base station, of the one or more base stations, is associated with a second MEC, and
a second set of configuration parameters for the particular MRU,
wherein determining at least one of the first or second sets of configuration parameters includes configuring the particular base station to forward traffic to the particular MRU for processing by the first MEC in lieu of processing the traffic at the second MEC associated with the particular base station;
implement the first set of configuration parameters at the one or more base stations of the particular sector at the particular time; and
implement the second set of configuration parameters at the particular MRU at the particular time.

7. The non-transitory computer-readable medium of claim 6, wherein determining at least one of the first or second sets of configuration parameters further includes:
determining, based on the set of sector models, that radio frequency ("RF") metrics associated with the predicted geographical location of the particular MRU are below a threshold level of RF metrics; and
configuring, based on determining that RF metrics associated with the predicted geographical location of the particular MRU are below the threshold level of RF metrics, the particular MRU as a wireless repeater associated with the one or more base stations.

8. The non-transitory computer-readable medium of claim 7, wherein configuring the particular MRU as the wireless repeater includes:
configuring at least one base station, of the one or more base stations, to forward wireless traffic, associated with a UE, to the particular MRU in lieu of forwarding the wireless traffic to the UE via wireless coverage provided by the at least one base station.

9. The non-transitory computer-readable medium of claim 6, wherein determining at least one of the first or second sets of configuration parameters further includes:
configuring the particular MRU as a wireless backhaul device associated with the one or more base stations.

10. The non-transitory computer-readable medium of claim 9, wherein configuring the particular MRU as the wireless backhaul device includes:
configuring at least a particular base station, of the one or more base stations, to forward wireless traffic to the particular MRU in lieu of forwarding the wireless traffic to the core network.

11. A method, comprising:
generating a plurality of sector models, wherein each sector model, of the plurality of sector models, is associated with a respective set of radio access network ("RAN") attributes;
generating a plurality of mobile radio unit ("MRU") models, wherein each MRU model, of the plurality of MRU models, is associated with a respective set of MRU attributes;
identifying a particular MRU, wherein the particular MRU provides wireless connectivity to a core network, wherein the particular MRU includes a first Multi-Access/Mobile Edge Computing ("MEC") device and mobility apparatus that facilitates mobility of the particular MRU, wherein identifying the particular MRU includes identifying a set of attributes of the particular MRU;
comparing the attributes of the particular MRU to MRU attributes included in the plurality of MRU models;
selecting a particular MRU model, of the plurality of MRU models, based on the comparing;
determining, based on historical information associated with the MRU, a predicted geographical location of the MRU at a particular time;
identifying, based on the predicted geographical location of the particular MRU, RAN attributes of a RAN that is associated with the predicted geographical location and that provides wireless connectivity to the core network;
selecting a particular sector model, of the plurality of sector models, based on the RAN attributes of the RAN associated with the predicted geographical location of the particular MRU;
determining, based on the particular MRU model and the particular set of sector models:

a first set of configuration parameters for one or more base stations associated with the RAN associated with the predicted geographical location of the MRU, wherein a particular base station, of the one or more base stations, is associated with a second MEC, and a second set of configuration parameters for the particular MRU, wherein determining at least one of the first or second sets of configuration parameters includes configuring the particular base station to forward traffic to the particular MRU for processing by the first MEC in lieu of processing the traffic at the second MEC associated with the particular base station;

implementing the first set of configuration parameters at the one or more base stations of the particular sector at the particular time; and implementing the second set of configuration parameters at the particular MRU at the particular time.

12. The method of claim 11, wherein determining at least one of the first or second sets of configuration parameters further includes:

determining, based on the set of sector models, that radio frequency ("RF") metrics associated with the predicted geographical location of the particular MRU are below a threshold level of RF metrics; and configuring, based on determining that RF metrics associated with the predicted geographical location of the particular MRU are below the threshold level of RF metrics, the particular MRU as a wireless repeater associated with the one or more base stations.

13. The method of claim 12, wherein configuring the particular MRU as the wireless repeater includes:

configuring at least one base station, of the one or more base stations, to forward wireless traffic, associated with a UE, to the particular MRU in lieu of forwarding the wireless traffic to the UE via wireless coverage provided by the at least one base station.

14. The method of claim 11, wherein determining at least one of the first or second sets of configuration parameters further includes:

configuring the particular MRU as a wireless backhaul device associated with the one or more base stations.

15. The method of claim 14, wherein configuring the particular MRU as the wireless backhaul device includes:

configuring at least one base station, of the one or more base stations, to forward wireless traffic to the particular MRU in lieu of forwarding the wireless traffic to the core network.

16. The method of claim 11, wherein selecting the particular sector model includes selecting the particular sector model further based on the particular time at which the MRU is predicted to be located at the predicted geographical location.

17. The device of claim 1, wherein selecting the particular sector model includes selecting the particular sector model further based on the particular time at which the MRU is predicted to be located at the predicted geographical location.

18. The device of claim 1, wherein the plurality of MRU models include one or more artificial intelligence/machine learning ("AI/ML") models.

19. The non-transitory computer-readable medium of claim 6, wherein the plurality of MRU models include one or more artificial intelligence/machine learning ("AI/ML") models.

20. The method of claim 11, wherein the plurality of MRU models include one or more artificial intelligence/machine learning ("AI/ML") models.

* * * * *